(12) United States Patent
Chen et al.

(10) Patent No.: US 10,995,237 B2
(45) Date of Patent: May 4, 2021

(54) POLYIMIDE HYBRID MATERIAL, PRECURSOR SOLUTION AND MANUFACTURE METHOD THEREOF

(71) Applicant: INDUSTRIAL TECHNOLOGY RESEARCH INSTITUTE, Hsinchu (TW)

(72) Inventors: Dong-Sen Chen, Zhudong Township (TW); Yu-Ju Kuo, New Taipei (TW); Chyi-Ming Leu, Jhudong Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 14 days.

(21) Appl. No.: 16/234,073

(22) Filed: Dec. 27, 2018

(65) Prior Publication Data

US 2019/0276704 A1    Sep. 12, 2019

Related U.S. Application Data

(63) Continuation-in-part of application No. 15/858,426, filed on Dec. 29, 2017, now abandoned.

(30) Foreign Application Priority Data

Dec. 26, 2018   (TW) .................................. 107147191

(51) Int. Cl.
*C09D 179/08*   (2006.01)
*C08G 73/10*    (2006.01)
(Continued)

(52) U.S. Cl.
CPC ....... *C09D 179/08* (2013.01); *C08G 73/1032* (2013.01); *C08G 73/1071* (2013.01);
(Continued)

(58) Field of Classification Search
CPC .......... C09D 179/08; C09D 7/67; C09D 7/62; C08G 73/1032; C08G 73/1071; C08K 3/36; C08K 9/06; C08K 2201/011
See application file for complete search history.

(56) References Cited

U.S. PATENT DOCUMENTS 7,790,828 B2 *   9/2010   Wu ...................... C09D 183/08
                                                    528/26
9,676,910 B2     6/2017   Cho et al.
(Continued)

FOREIGN PATENT DOCUMENTS

CN   101831175 A  *  9/2010
CN   102532541 A     7/2012
(Continued)

OTHER PUBLICATIONS

JP-2005325147-A Translation (Year: 2005).*
(Continued)

*Primary Examiner* — Travis M Figg
(74) *Attorney, Agent, or Firm* — Birch, Stewart, Kolasch & Birch, LLP

(57) ABSTRACT

A polyimide precursor solution is provided. The polyimide precursor solution includes 100 parts by weight of a fully aromatic polyamic acid, from 5 to 20 parts by weight of silica particles, from 5 to 80 parts by weight of an alkoxysilane, and from 40 to 80 parts by weight of a solvent.

18 Claims, 4 Drawing Sheets

(51) Int. Cl.
  *C08K 9/06* (2006.01)
  *C09D 7/40* (2018.01)
  *C09D 7/62* (2018.01)
  *C08K 3/36* (2006.01)

(52) U.S. Cl.
  CPC ............... *C08K 3/36* (2013.01); *C08K 9/06* (2013.01); *C09D 7/62* (2018.01); *C09D 7/67* (2018.01); *C08K 2201/011* (2013.01)

(56) References Cited

U.S. PATENT DOCUMENTS

| | | | |
|---|---|---|---|
| 2005/0048297 A1* | 3/2005 | Fukuda | C08G 73/1039 428/458 |
| 2010/0297455 A1* | 11/2010 | Wu | C09D 183/08 428/447 |
| 2011/0130495 A1* | 6/2011 | Leu | C08J 3/215 524/104 |
| 2011/0269857 A1* | 11/2011 | Lee | C08G 73/22 521/55 |
| 2013/0035447 A1* | 2/2013 | Jeong | C08G 73/1067 525/436 |
| 2013/0267651 A1* | 10/2013 | Liang | C08L 83/10 524/588 |
| 2014/0316074 A1* | 10/2014 | Park | C09D 179/08 525/435 |
| 2015/0307693 A1* | 10/2015 | Cho | C08G 83/001 524/600 |
| 2016/0137789 A1* | 5/2016 | Suenaga | C08K 3/36 428/220 |
| 2016/0222165 A1* | 8/2016 | Wakita | C08G 73/1075 |
| 2017/0190910 A1* | 7/2017 | Uno | C08G 73/10 |
| 2017/0327654 A1* | 11/2017 | Ikeuchi | C08K 3/36 |

FOREIGN PATENT DOCUMENTS

| | | |
|---|---|---|
| CN | 103013116 A | 4/2013 |
| CN | 103694475 A | 4/2014 |
| CN | 105255177 A | 1/2016 |
| CN | 105440284 A | 3/2016 |
| CN | 105482113 A | 4/2016 |
| CN | 108291088 A | 7/2018 |
| JP | 08073739 A * | 3/1996 |
| JP | 2005-320544 A | 11/2005 |
| JP | 2005325147 A * | 11/2005 |
| JP | 2016-17169 A | 2/2016 |
| KR | 10-2014-0133165 A | 11/2014 |
| KR | 10-2015-0123643 A | 11/2015 |
| KR | 10-2015-0138976 A | 12/2015 |
| KR | 10-2016-0007442 A | 1/2016 |
| TW | 201208839 A1 | 3/2012 |
| TW | 201522421 A | 6/2015 |
| TW | 201609970 A | 3/2016 |
| TW | 201714922 A | 5/2017 |
| TW | 201741688 A | 12/2017 |
| WO | WO 2017-098936 A1 | 6/2017 |

OTHER PUBLICATIONS

Chinese Office Action and Search Report for Chinese Application No. 201811629473.2, dated Dec. 3, 2020.

Bae, W.J., et al, "Towards colorless polyimide/silica hybrids for flexible substrates," Polymer, 2016, vol. 105, pp. 124-132.

Kim, S U., et al, "Highly transparent triethoxysilane-terminated copolymide and its SiO2 composite with enhanced thermal stability and reduced thermal expansion," European Polymer Journal, 2015, vol. 64, pp. 206-214.

Ni, H.J., et al, "A review on colorless and optically transparent polyimide films: Chemistry, process and engineering applications," Journal of Industrial and Engineering Chemistry, 2015, vol. 28, pp. 16-27.

Taiwanese Office Action and Search Report for Taiwanese Application No. 107100048, dated Sep. 6, 2018

Tsai, C.L., et al, "Highly transparent polyimide hybrids for optoelectronic applications," Reactive and Functional Polymers, 2016, vol. 108, pp. 2-30.

Wang, Y.W. et al, "Synthesis, properties, and anti-reflective applications of new colorless polyimide-inorganic hybrid optical materials", Composites Science and Technology, 2010, vol. 70, pp. 769-775.

* cited by examiner

POLYIMIDE HYBRID MATERIAL, PRECURSOR SOLUTION AND MANUFACTURE METHOD THEREOF

CROSS REFERENCE TO RELATED APPLICATIONS

This application is a Continuation-in-Part of U.S. application Ser. No. 15/858,426 filed on Dec. 29, 2017, which claims priority under 35 U.S.C. § 119(a) to Patent Application No. 107147191 filed in Taiwan on Dec. 26, 2018, the entire contents of which are hereby incorporated by reference.

TECHNICAL FIELD

The present disclosure relates to a polymeric material, and in particular it relates to a polyimide hybrid material, a precursor solution, and a manufacturing method thereof.

BACKGROUND

Polyimide has flexibility, sufficient mechanical strength, chemical resistance and other characteristics, and thus is widely used in various industries such as the plastics industry, the electronics industry, and the aerospace industry.

As display technologies have developed, transparent displays have acquired such advantages as being thin and transparent, and they can combine information on the panel with entities to provide more information. Due to the rise of transparent displays, the need for flexible substrates used as transparent displays has increased in recent years. Polyimide has flexibility and sufficient mechanical strength and is therefore suitable for use as substrates for flexible transparent displays. However, current polyimide substrate materials still have some properties to be improved in order to meet people's increasingly stringent requirements for the quality of displays.

SUMMARY

The present disclosure provides a polyimide precursor solution, including 100 parts by weight of a fully aromatic polyamic acid; 5-20 parts by weight of silica particles; 5-80 parts by weight of an alkoxysilane; and 40-80 parts by weight of a solvent.

The present disclosure also provides a polyimide hybrid material, including 95-40 parts by weight of a fully aromatic polyimide; and 5-60 parts by weight of an inorganic silicon mixture, wherein the inorganic silicon mixture is silica particles connected to each other by a siloxane skeleton and the siloxane skeleton forms a hydrogen bond with the polyimide, and the polyimide hybrid material has a transmittance that is greater than 80% at a wavelength of 550 nm and a yellowing b* less than 3.

The present disclosure further provides a manufacturing method of polyimide hybrid material, including (a) condensation polymerizing at least one aromatic dianhydride monomer and at least one aromatic diamine monomer in a solvent to form a fully aromatic polyamic acid; (b) providing a silica mixture containing a silica sol and an alkoxysilane; (c) mixing the silica mixture with the fully aromatic polyamic acid to form a polyimide precursor solution; and (d) performing an imidization to the polyimide precursor solution to form a polyimide hybrid material.

A detailed description is given in the following embodiments with reference to the accompanying drawings.

DETAILED DESCRIPTION

The polyimide substrate materials that are currently used may undergo yellowing during high-temperature processing. Therefore, there is a need for a polyimide substrate material that can maintain high transparency and low yellowing even after a high-temperature process, to meet the needs of transparent displays.

The present disclosure provides a polyimide hybrid material introduced with a fully aromatic monomer. Also, a particle-miniaturized hybridization and an alkoxysilane are used to undergo a sol-gel reaction to form the dendritic siloxane skeleton between the silica particles. The dendritic siloxane skeleton is able to form hydrogen bonds with the polyimide polymers. In this way, it is possible to produce a polyimide thin film with high transparency and low yellowing under a high-temperature process.

Figure 1:
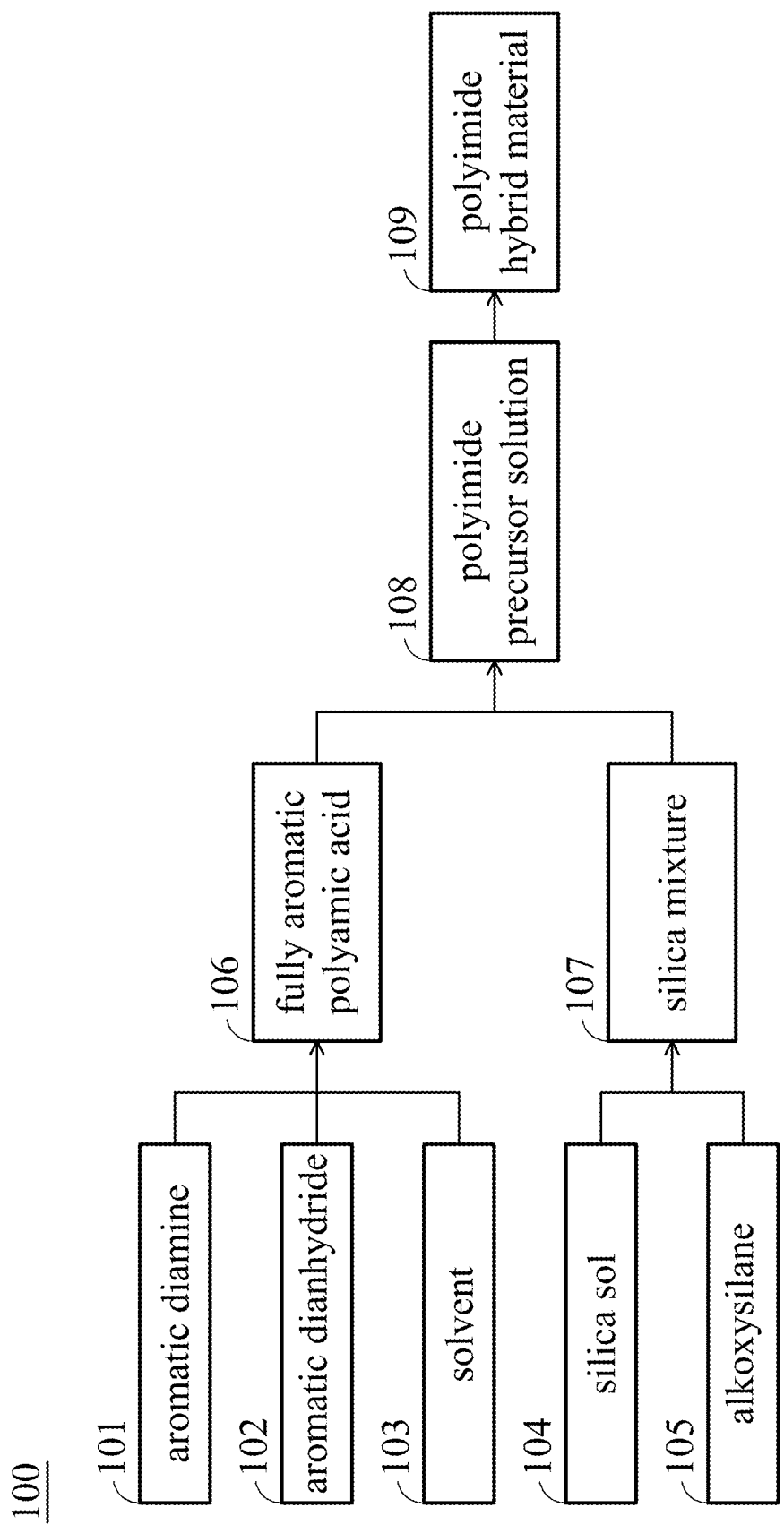
FIG. 1 is a flow chart for manufacturing the polyimide hybrid material of the embodiments of the present disclosure.

Please refer to the flow chart of FIG. 1, the polyimide hybrid material 109 of the present disclosure is formed by performing an imidization 109 to the polyimide precursor solution 108. The polyimide precursor solution 108 is formed by mixing a fully aromatic polyamic acid 106 and a silica mixture 107. The fully aromatic polyamic acid 106 is formed by condensation polymerizing an aromatic diamine 101, an aromatic dianhydride 102, and a solvent 103. The silica mixture 107 includes a silica sol 104 and an alkoxysilane 105. Hereinafter, the manufacturing method of the polyimide hybrid material will be described in detail.

Since the fully aromatic polyamic acid polymerized from the aromatic diamine and the aromatic dianhydride has aromatic rings with high bond energy, the thermal resistance is good and the resulting polyimide is not easily cracked even at high temperature. However, because of the intramolecular resonance caused by aromatic rings, it is easy to result in the yellowing of polyimides due to charge transfer.

According to the embodiments of the present disclosure, it is preferable that at least one of the aromatic diamine and the aromatic dianhydride has halogen or haloalkyl substituents. The halogen or haloalkyl substituents are electron-withdrawing groups and are therefore capable of reducing the intramolecular resonance of polyimide polymers, and achieve the effect of reducing the yellowing of polyimides.

The aromatic diamine 101 used in the present disclosure may have a structure like the one shown in one of the following formulas, formula (1) to formula (3). Since having aromatic rings with high bond energy, the aromatic diamine has high thermal resistance.

formula (1)

[Structure: H₂N-phenyl(R²)ₙ-NH₂]

formula (2)

[Structure: H₂N-phenyl(R²)ₙ-R¹-phenyl(R²)ₙ-NH₂]

formula (3)

[Structure: H₂N-phenyl-R¹-phenyl(R²)ₙ-phenyl(R²)ₙ-R¹-phenyl-NH₂]

wherein R¹ is a single bond, —O—, —S—, —CH₂—, —S(O)₂—, —C(CF₃)₂—, —C(CH₃)₂—, —O—(CH₂)$_c$—O—, —(O—CH₂—CH₂)$_c$—O—, haloalkyl group, substituted or unsubstituted $C_{1-10}$ linear or branched hydrocarbylene group, substituted or unsubstituted $C_{6-20}$ arylene group, $$-O-\left(\phenyl(R^2)_m-R^5-\phenyl-O\right)_d-,$$

$$-\left(N\text{-piperazine-}N\right)-, \text{ or } -O-\left(\phenyl(R^2)_m-O\right)_d-,$$

wherein each of c and d is independently an integer between 1 and 20; each of m is independently an integer between 0 and 4;
each of $R^2$ is independently hydrogen, halogen, alkyl group, $C_{1-4}$ alkoxy group, hydroxyl group, $C_{1-4}$ haloalkyl group, or substituted or unsubstituted $C_{1-6}$ hydrocarbon group; $R^5$ is a single bond, —S(O)₂—, substituted or unsubstituted $C_{1-4}$ linear or branched hydrocarbylene group, or $C_{1-4}$ halogenalkylene group; and
each of n is independently an integer between 0 and 4.

It should be noted that, in the present disclosure, one type of aromatic diamine may be used alone, and two or more types of aromatic diamine may also be used in combination. In some embodiments, the aforementioned aromatic diamine has the following structures:

[Structure: H₂N-phenyl-NH₂, and bis(2-aminophenyl)ethane]

[Structure: 3,3'-dimethylbenzidine]

[Structure: 4,4'-oxydianiline]

[Structure: 4,4'-methylenedianiline]

[Structure: 4,4'-sulfonyldianiline]

[Structure: 1,3-bis(3-aminophenoxy)benzene]

[Structure: 1,3-bis(4-aminophenoxy)benzene]

[Structure: 3,3'-sulfonyldianiline]

[Structure: 1,4-bis(4-aminophenoxy)-4-phenoxybenzene triether]

[Structure: bis(4-aminophenoxy)biphenyl diether]

[Structure: tetramethyl-substituted bis(4-aminophenoxy)benzene with isopropyl groups]

[Structure: 2,2-bis[4-(4-aminophenoxy)phenyl]propane]

[Structure: 2,2'-bis(trifluoromethyl)benzidine]

[Structure: 2,2',5,5'-tetrachlorobenzidine]

[Structure: octafluorobenzidine]

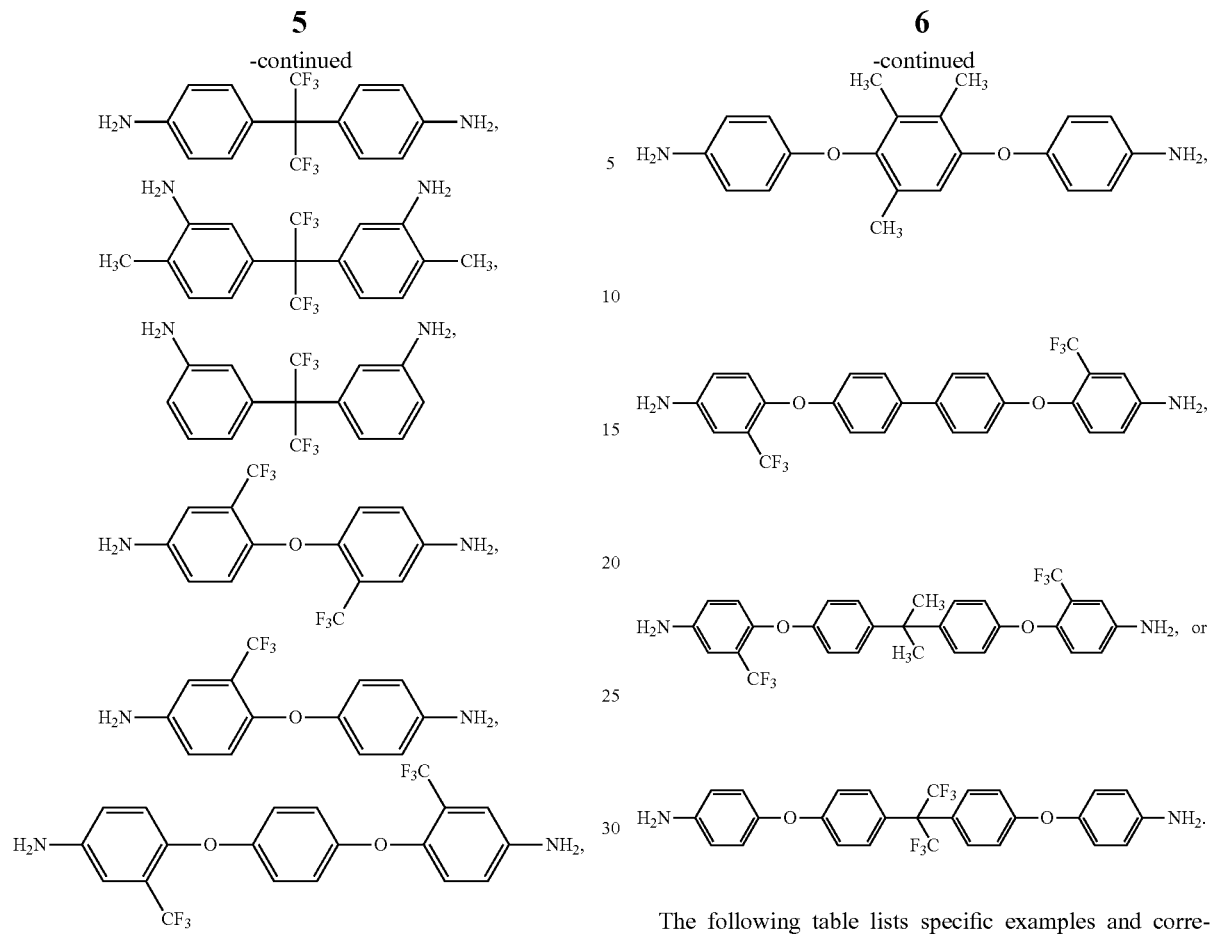

The following table lists specific examples and corresponding chemical names of some aromatic diamines.

| aromatic diamine | chemical name |
| --- | --- |
| H₂N–⌬–O–⌬–⌬–O–⌬–NH₂ | 4,4'-bis(4-aminophenoxy) biphenyl (BAPB) |
| H₂N–⌬–O–⌬–NH₂ | 4,4'-diaminodiphenyl ether (ODA) |
| H₂N–⌬(CH₃)–⌬(CH₃)–NH₂ | 3,3'-dimethylbiphenyl- diamine (DMB) |
| H₂N–⌬–O–⌬–C(CH₃)₂–⌬–O–⌬–NH₂ | 2,2-bis[4-(4-aminophenoxy) phenyl]propane (BAPP) |
| H₂N–⌬(CF₃)–⌬(CF₃)–NH₂ | 2,2'-bis(trifluoromethyl) benzidine (TFMB) |

The aromatic dianhydride used in the present disclosure may have a structure like the one shown in one of the following formulas, formula (4) or formula (5). Since having aromatic rings with high bond energy, the aromatic dianhydride has high thermal resistance.

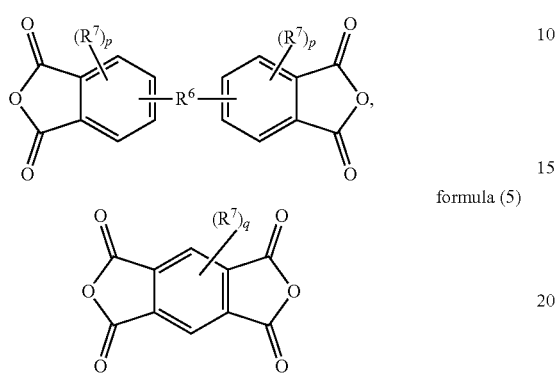

formula (4)

formula (5)

wherein $R^6$ is a single bond, —O—, —S—, —CH$_2$—, —S(O)$_2$—, —C(CF$_3$)$_2$—, —C(CH$_3$)$_2$—, —O—(CH$_2$)$_c$—O—, —(O—CH$_2$—CH$_2$)$_c$—O—, haloalkyl group, substituted or unsubstituted $C_{1-10}$ linear or branched hydrocarbylene group, substituted or unsubstituted $C_{6-20}$ arylene group,

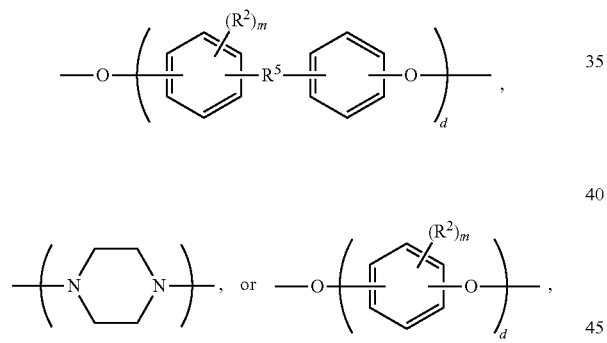

wherein each of c and d is independently an integer between 1 and 20; each of m is independently an integer between 0 and 4; each of $R^2$ is independently hydrogen, halogen, alkyl group, $C_{1-4}$ alkoxy group, hydroxyl group, $C_{1-4}$ haloalkyl group, or substituted or unsubstituted $C_{1-6}$ hydrocarbon group; $R^5$ is a single bond, —S(O)$_2$—, substituted or unsubstituted $C_{1-4}$ linear or branched hydrocarbylene group, or $C_{1-4}$ halogenalkylene group;

each of $R^7$ is independently hydrogen, halogen, alkyl group, $C_{1-4}$ alkoxy group, hydroxyl group, $C_{1-4}$ haloalkyl group, or substituted or unsubstituted $C_{1-6}$ hydrocarbon group;

each of p is independently an integer between 0 and 4; and q is an integer between 0 and 2.

It should be noted that, in the present disclosure, one type of aromatic dianhydride may be used alone, and two or more types of aromatic dianhydride may also be used in combination. In some embodiments, the aforementioned aromatic dianhydride has the following structure:

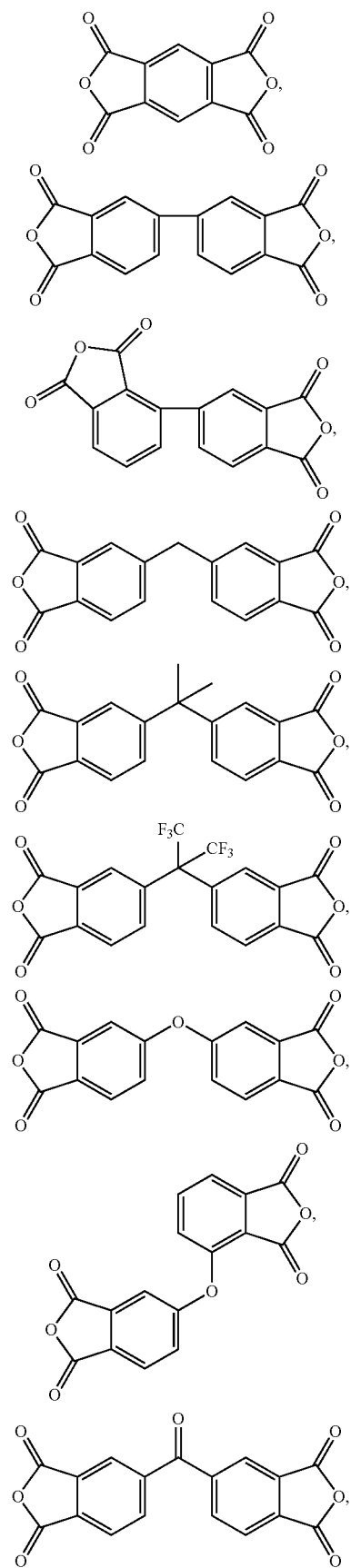

-continued

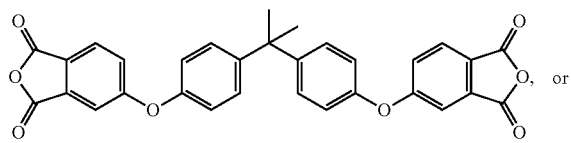, or

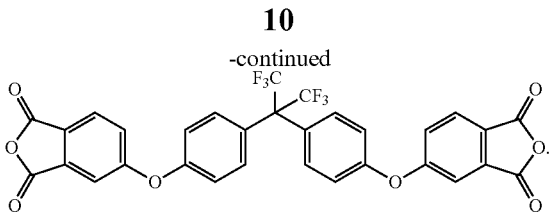.

The following table lists specific examples and corresponding chemical names of some aromatic dianhydrides.

| aromatic dianhydride | chemical name |
| --- | --- |
|  | 3,3',4,4'-biphenyltetracarboxylic dianhydride (BPDA) |
|  | pyromellitic dianhydride (PMDA) |
|  | 3,3',4,4'-benzophenonetetracarboxylic dianhydride (BTDA) |
|  | 4,4-bisphenol A dianhydride (BPADA) |
|  | diphenylether tetracarboxylic dianhydride (ODPA) |
|  | 2,2-bis[4-(3,4-dicarboxyphenoxy)phenyl] hexafluoroisopropane dianhydride |

| aromatic dianhydride | chemical name |
|---|---|
| (structure: 4,4'-(hexafluoroisopropylidene)diphthalic anhydride with two phthalic anhydride groups connected by C(CF$_3$)$_2$) | 4,4'-(hexafluoroisopropylidene) diphthalic anhydride (6FDA) |

The solvent 103 used in the present disclosure may include, for example, N,N-dimethylformamide (DMF), N,N-diethylformamide, N,N-dimethylacetamide (DMAc), N,N-diethylacetamide, N-methylpyrrolidone (NMP), N-ethylpyrrolidone (NEP), dimethylsulfoxide (DMSO), diethyl sulfoxide, γ-butyrolactone (GBL), xylene, tetrahydrofuran, or a combination thereof.

The manufacturing method of the fully aromatic polyamic acid 106 is to dissolve an appropriate amount of aromatic diamine 101 in the solvent 103 first and the aromatic dianhydride 102 is added thereafter, and then it is heated to undergo a condensation polymerization. The condensation polymerization may last for 4-12 hours at 180-230° C., for example, reacting at 210° C. for 4 hours. After the reaction is completed, it is cooled down to obtain the fully aromatic polyamic acid 106.

The molar ratio of the added aromatic diamine and the aromatic dianhydride may be properly selected according to the needs, and it is usually 1:1.15-1:1.02. If the amount of aromatic diamine is too high or the amount of aromatic dianhydride is too high, the resulting polyamic acid is easily hydrolyzed and difficult to be preserved. The weight average molecular weight of the fully aromatic polyamic acid of the present disclosure may be 100,000-500,000, for example, may be 150,000-350,000.

The manufacturing method of the present disclosure further includes mixing the silica sol 104 and the alkoxysilane 105 to form the silica-containing mixture 107. The silica mixture 107 will be subsequently used to form the siloxane skeleton.

The aforementioned silica sol 104 is formed by uniformly dispersing silica particles in a solvent. Because the particles are small enough, they do not settle due to gravity. Also, no gelation would occur and the silica particles do not aggregate into blocks. The silica particles contained in the silica sol have a particle size ranging from 5 nm to 50 nm, for example, 10 nm to 30 nm. The solvent may be aqueous or may be organic solvents, for example, water, alcohols, and so on. The concentration of the silica particles in the silica sol is usually between 25-50 wt %. Appropriate concentration may be selected according to the needs.

The silica sol may be manufactured by the following method. The alkali metal silicate solution is neutralized to form silicon dioxide cores in the solution. The size of the silicon dioxide core may be changed by adjusting the pH value of the solution. If the pH value is lower than 7 or an acid is added, the silicon dioxides form larger particles and are unstable in the solution. If the solution continues to have a weak base, silicon dioxides remain separated and begin to grow into silicon dioxide particles. After the required particle size is obtained, the pH value of the solution can be adjusted so that the silica dioxide particles are stably suspended in the solvent. The pH value is usually between 8 and 10. Commercial silica sol such as sodium silicate may also be used.

The aforementioned alkoxysilane 105 may have the following structure: Si(OR)$_4$, wherein R is $C_1$-$C_{10}$ hydrocarbon group, which may be $C_2$-$C_6$ hydrocarbon group. The hydrocarbon group includes alkyl groups, aromatic groups, aromatic alkyl groups, alkenyl groups, or aromatic alkenyl groups having 1-10 carbon atoms. The specific embodiments of the alkoxysilane 105 includes tetramethoxysilane, tetraethoxysilane, tetraisopropoxysilane, tetrapropoxysilane, tetrabutoxysilane, tetraphenoxysilane, tetra(2-methoxyethoxy)silane, tetra(2-ethylhexyloxy)silane, tetraallyloxysilane, or a combination thereof.

The polyimide precursor solution 108 is formed by mixing the aforementioned fully aromatic polyamic acid 106 and the aforementioned silica mixture 107. It should be noted that the polyimide precursor solution in the embodiments of the present disclosure does not include catalysts for a sol-gel reaction. This part will be described in detail later.

The composition of the polyimide precursor solution of the present disclosure includes 5-20 parts by weight of silica particles, 5-80 parts by weight of an alkoxysilane, and 40-80 parts by weight of a solvent, compared to 100 parts by weight of a fully aromatic polyamic acid. The solid content of the polyimide precursor solution of the present disclosure may be between 10-50 parts by weight, such as 20-40 parts by weight.

In some embodiments, the composition of the polyimide precursor solution includes the silica particles between 5-10 parts by weight, 10-15 parts by weight, or 15-20 parts by weight. In other embodiments, the alkoxysilane is between 10-40 parts by weight, 5-25 parts by weight, or 5-10 parts by weight. When the ratio of alkoxysilane in the polyimide precursor solution is lower than 5 parts by weight, the overall silica conversion rate is too low so that the amount of nanoparticles is too small, such that the yellow index cannot be reduced. When the ratio is higher than 80 parts by weight, the nanoparticles will self-aggregate and the haze is increased and the transmittance is decreased.

Various additives may be added to the polyimide precursor solution 108 of the present disclosure as needed, for example, leveling agents, defoaming agents, coupling agents, dehydrating agents, metal adhesion promoters, ring-closure promoters, and so on.

The polyimide hybrid material 109 of the present disclosure is produced after performing an imidization to the aforementioned polyimide precursor solution 108. The method for performing the imidization to the polyamic acid includes thermal imidization. The thermal imidization may be performed at 300-500° C. for 4-8 hours, for example, at 400° C. for 6 hours.

According to the manufacturing method of the present disclosure, the thermal imidization and the self-assembly are performed simultaneously to form the siloxane skeleton. Generally, when alkoxysilane is used to produce siloxane skeleton by sol-gel reaction, catalysts are needed to be added to promote the reaction. For example, acid catalysts or base catalysts can be used to adjust the pH value. Examples of acid catalysts include hydrochloric acid, sulfuric acid, and nitric acid. Examples of base catalysts include sodium hydroxide and ammonia. Examples of neutral catalysts include amino-siloxane and amino compound. In the polyimide precursor solution of the present disclosure, alkoxysilane forms a siloxane skeleton on the silica particles, which is merely promoted by the high temperature of thermal imidization without adding catalysts, then forms the inorganic silicon mixture of self-assembled nano-scaled silica particles with the dendritic siloxane skeleton connecting the silica particles to one another.

Moreover, the catalyst of the sol-gel reaction is also responsible for the yellowing of polyimide. The polyimide precursor solution maintains the effect of low yellowing by not containing the catalyst of the sol-gel reaction.

Before performing the thermal imidization, a coating step may be further included to form a substrate or a thin film. The thickness of thin film may be adjusted according to practical needs. For example, the thickness may be 5-40 g m, such as 12-20 g m. Commonly used coating methods may be selected according to the need, and may include a dipping coating method, a spin coating method, a roll coating method, a blade coating method, a rod coating method, and so on, for example.

Figure 2:
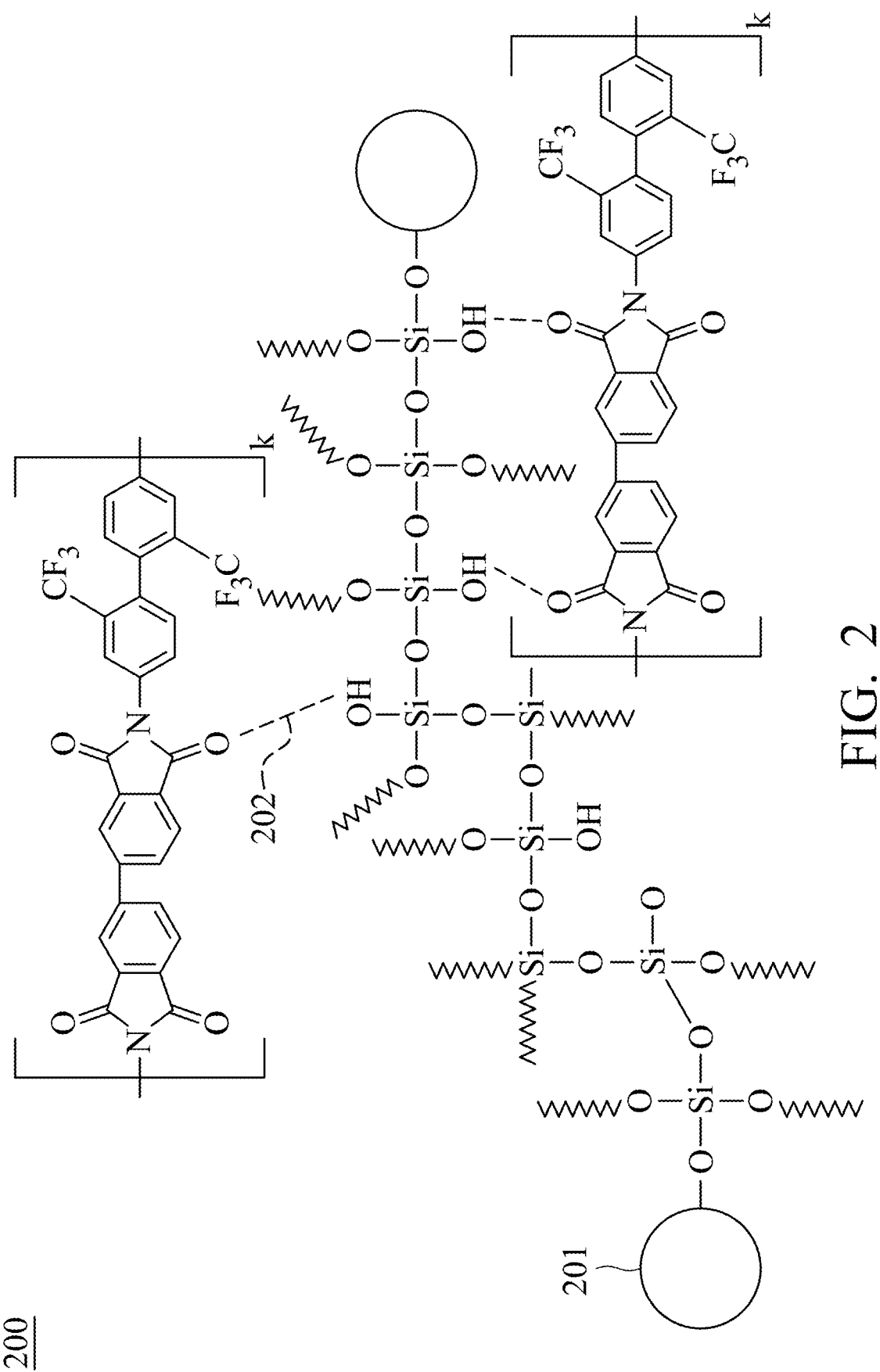
FIG. 2 is a schematic structural diagram of the polyimide hybrid material of the embodiments of the present disclosure.

Regarding the polyimide hybrid material 110 in the embodiments of the present disclosure, as shown in the schematic diagram 200 of FIG. 2, by using the miniaturized silica particles 201 and alkoxysilane to form the self-assembled siloxane skeleton, a surface area effect may be increased and therefore the effect of reducing the yellowing of polyimide is achieved. In addition, since hydrogen bonds 202 are formed between the silica particles 201 and the polyimide polymer molecules, the charge transfer between the polyimide polymer molecules may be reduced, thereby reducing the yellowing. In this way, by simultaneously using the miniaturized silica particles and the alkoxysilane can not only enhance the transmittance of polyimide hybrid material but also reduce the yellowing. In comparison, although the transmittance of polyimide hybrid material which only includes silica particles is enhanced, the yellowing is not reduced. The k in FIG. 2 represents the number of the repeat unit of polyamic acid, which may be an integer between 10 and 600, for example, may be between 100 and 150. In one embodiment, the dendritic branch width of the dendritic structure is 5-30 nm, for example, may be 10-20 nm. It should be noted that the polyimide of FIG. 2 is used as an example of the structure of the fully aromatic polyimide, but the polyimide of the present disclosure is not limited thereto.

The polyimide hybrid material according to the embodiments of the present disclosure includes a fully aromatic polyamic acid and an inorganic silicon mixture formed by alkoxysilane and silica particles. In some embodiments, the composition of the polyimide hybrid material includes 95-40 parts by weight of a fully aromatic polyimide; and 5-60 parts by weight of an inorganic silicon mixture. In other embodiments, the composition of the polyimide hybrid material includes 80-40 parts by weight of the fully aromatic polyimide; and 20-60 parts by weight of the inorganic silicon mixture. In further embodiments, the composition of the polyimide hybrid material includes 80-20 parts by weight of the fully aromatic polyimide; and 20-80 parts by weight of the inorganic silicon mixture.

The inorganic silicon mixture of the polyimide hybrid material includes silica particles and a siloxane skeleton formed thereon by alkoxysilane. Based on the total weight of the inorganic silicon mixture, in some embodiments, the silica particles are about 15-90 wt % and the siloxane skeleton is about 85-10 wt %. In other embodiments, the silica particles are about 20-85 wt % and the siloxane skeleton is about 80-15 wt %. In further embodiments, the silica particles are about 25-80 wt % and the siloxane skeleton is about 75-20 wt %.

According to the embodiments of the present disclosure, the polyimide hybrid material has high transparency. In one embodiment, the thermal resistance of the polyimide thin film is that the polyimide thin film is not cracked at 450° C. for 4 hours, a transmittance (%) of greater than 80% at a wavelength of 550 nm, and a yellowing b* less than 3. In the preferred embodiments, the transmittance (%) is greater than 89% and the yellowing b* is less than 2.9.

The polyimide hybrid material in the embodiments of the present disclosure has the characteristics of maintaining high transmittance and low yellowing even after a high-temperature processing, and thus is suitable for use as a flexible substrate for various industries, such as displays, optoelectronics, wearable products, and so on. In addition, although the exemplified polyimide hybrid material may be a thin film, the present disclosure is not limited thereto. The polyimide hybrid material may also be used as coating, fibers, foam plastics, photoresists, alignment agents for liquid-crystal displays, waveguide materials, optical switch materials, and so on.

Preparation Example 1: Fully Aromatic Polyamic Acid

A three-necked bottle was filled with nitrogen gas at room temperature, and 0.073 mole of ODA and 0.172 mole of TFMB used as diamine were dissolved in 426 g of γ-butyrolactone (gamma-butyrolactone), then 0.250 mole of dianhydride BPADA was added after the two diamines were fully dissolved. After BPADA was fully dissolved, the stirring was kept up for 6 hours to form a viscous polyamic acid solution.

Preparation Example 2: Silica Sol and Alkoxysilane

Silica sol was prepared by respectively adding 100 g of acidic aqueous silicon dioxide sol (20 nm, spherical) with 20% solid content, 80 g of isopropanol, and 80 g of DMAc to a 500 ml reactor and distilling water and isopropanol at 25° C.-40° C. by using reduced pressure distillation. Then, a dispersion of silica sol with 20% solid content dispersed in DMAc was obtained. The alkoxysilane (B) was purchased from ACROS.

Example 1: Polyimide Hybrid Material 10 g of dispersion with 20% solid content dispersed in DMAc (A), 0 g of alkoxysilane (B), and 8 g of polyimide polymer solution (PAA) were put into a 20 g sample vial and stirred at room temperature for 30 minutes, then coated on a glass by blade coating and put in an oven at a temperature of 50° C., 150° C., 210° C., 300° C., and 400° C. for one hour each. The dried coating was removed to obtain the 20% silica/polyimide hybrid thin film.

The resulting polyimide thin films were analyzed by thermal gravimetric analysis (TGA) to obtain the content of the inorganic silicon mixture of the thin films. The silica and siloxane skeleton formed by alkoxysilane remained during the thermal gravimetric analysis. Therefore, as shown in equation (1), the content of the siloxane skeleton can be obtained by subtracting the content of the silica precursor from the content of the inorganic silicon mixture. The content of the siloxane skeleton is then divided by the content of the added alkoxysilane and multiplied by 100 to calculate the alkoxysilane conversion rate. The results are listed in Table 1. When the added alkoxysilane content is 0, the alkoxysilane conversion rate is set to 0%.

$$\frac{\text{the content of the inorganic silicon mixture} - \text{the content of silica}}{\text{alkoxysilane}} \times 100 = \text{the alkoxysilane conversion rate}(\%) \quad \text{Equation (1)}$$

Examples 2-4

The same process as in Example 1 was repeated to prepare the polyimide thin film, except that the precursor solutions of Examples 2-4 were respectively prepared according to the ratio cited in Table 1. The resulting polyimide thin films were analyzed by thermal gravimetric analysis (TGA), and the alkoxysilane conversion rates of the alkoxysilane forming the siloxane skeleton were calculated. The results are listed in Table 1.

Figure 3:
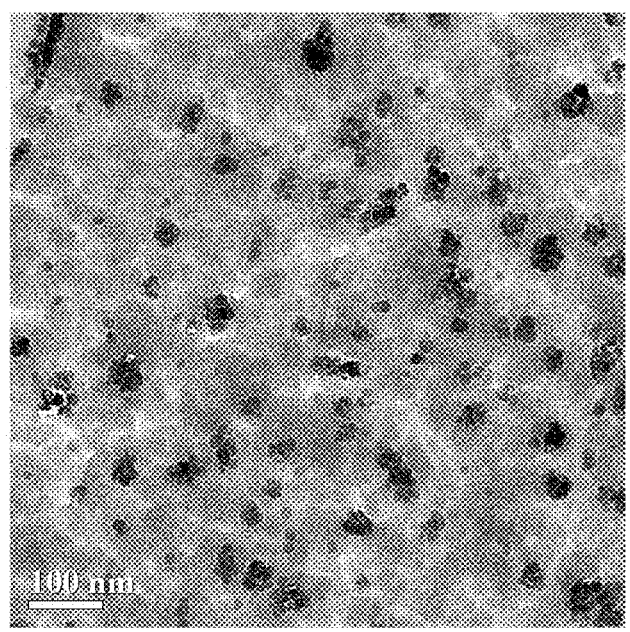
FIG. 3 is a transmission electron micrograph of the polyimide hybrid material of an example.

In addition, the resulting polyimide thin film was observed by using a transmission electron microscope, the obtained image was shown in FIG. 3. As can be realized from the result of FIG. 3, the silica particles in the polyimide thin film have a dendritic structure.

It can be realized from the values in Table 1 that by adding alkoxysilane to the polyimide precursor solution and performing an imidization, the content of the inorganic silicon mixture in the thin films was increased. The reason is that the silica can function as a starting point during the process of the alkoxysilane forming siloxane; therefore, alkoxysilane is attached to silica and starts to grow and cross-link, thereby forming the dendritic siloxane skeleton.

Examples 5-12 and Comparative Example 1

The same process as in Example 1 was repeated to prepare the polyimide thin film, except that the precursor solutions of Examples 5-12 and Comparative Example 1 were respectively prepared according to the ratio cited in Table 2. The resulting polyimide thin films were respectively measured by a spectrophotometer (SA-400, manufactured by NIPPON DENSHOKU) to obtain the transmittance at a wavelength of 550 nm, yellowing (b*), and yellow index (YI). The results are listed in Table 2.

TABLE 2

| | polyamic acid (parts by weight) | silica (parts by weight) | TEOS (parts by weight) | transmittance at 550 nm (%) | yellowing (b*) | yellow index (YI) | thickness (μm) |
|---|---|---|---|---|---|---|---|
| Comparative Example 1 | 100 | 0 | 0 | 85.51 | 17.06 | 27.66 | 19-21 |
| Example 5 | 75 | 10 | 15 | 86.81 | 15.62 | 25.19 | 19-21 |
| Example 6 | 70 | 10 | 20 | 86.66 | 15.06 | 24.41 | 19-21 |
| Example 7 | 60 | 10 | 30 | 87.2 | 13.56 | 22.07 | 17-20 |
| Example 8 | 50 | 10 | 40 | 87.2 | 11.52 | 18.8 | 19-21 |
| Example 9 | 80 | 5 | 15 | 86.37 | 16.51 | 26.58 | 19-21 |
| Example 10 | 75 | 5 | 20 | 85.84 | 15.53 | 25.22 | 20-21 |
| Example 11 | 65 | 5 | 30 | 85.03 | 14.06 | 23.11 | 19-21 |
| Example 12 | 55 | 5 | 40 | 85 | 13.16 | 22.32 | 19-21 |

As can be realized from the result of Table 2, compared to Comparative Example 1 in which no silica miniaturized particles and TEOS was added, the polyimide thin films of the present disclosure (Examples 5-12) have higher transmittance at a wavelength of 550 nm (2% enhanced), and the yellowing (b*) and yellow index (YI) thereof are both reduced.

Examples 13-14 and Comparative Examples 2-4

The same process as in Example 1 was repeated to prepare the polyimide thin film, except that the precursor solutions of Examples 13-14 and Comparative Examples 2-4 were respectively prepared according to the ratio cited in Table 3. The resulting polyimide thin films were cut into a size of 5*5 cm and measured by a spectrophotometer (SA-400, manufactured by NIPPON DENSHOKU) according to the method described in ASTM E308 to obtain the transmittance at a wavelength of 550 nm and the yellowing (b*). The results are listed in Table 3.

TABLE 1

| | polyamic acid (parts by weight) | silica (parts by weight) | TEOS (parts by weight) | content of inorganic silicon mixture (parts by weight) | alkoxysilane conversion rate (%) |
|---|---|---|---|---|---|
| Example 1 | 80 | 20 | 0 | 21.1 | 0 |
| Example 2 | 80 | 15 | 5 | 17.7 | 54.4 |
| Example 3 | 80 | 5 | 15 | 10.3 | 35.3 |
| Example 4 | 80 | 0 | 20 | 3.3 | 16.5 |

TABLE 3

| | polyamic acid (parts by weight) | silica (parts by weight) | TEOS (parts by weight) | VU-visible light transmittance at 550 nm (%) | SA-4000 transmittance at 550 nm (%) | yellowing (b*) | thickness (μm) |
|---|---|---|---|---|---|---|---|
| Comparative Example 2 | 100 | 0 | 0 | 85.324 | 85.91 | 15.71 | 19-21 |
| Comparative Example 3 | 90 | 10 | 0 | 84.37 | 84.9 | 18.21 | 21-23 |
| Comparative Example 4 | 80 | 20 | 0 | 85.774 | 86.12 | 15.96 | 21-23 |
| Example 13 | 75 | 20 | 5 | 85.966 | 86.08 | 15.99 | 18-22 |
| Example 14 | 70 | 20 | 10 | 86.533 | 86.68 | 13.73 | 21-23 |

As can be realized from the result of Table 3, compared to Comparative Example 2 which only includes polyamic acid, Comparative Examples 3 and 4 in which silica particles were added have enhanced transmittances; however, the yellowing is not reduced. Moreover, the yellowing is enhanced in Comparative Example 3. In comparison, Examples 13 and 14 in which TEOS were added not only have higher transmittance but also reduced yellowing.

Examples 15-22 and Comparative Example 5

The same process as in Example 1 was repeated to prepare the polyimide thin film, except that T300B (diamine: ODA, TFMB; dianhydride: BPADA, BPDA; molar ratio was 1:1.05, manufactured by WAKAYAMA) was used as polyamic acid and the precursor solutions of Examples 15-22 and Comparative Example 5 were respectively prepared according to the ratio cited in Table 4. The resulting polyimide thin films were respectively measured by a spectrophotometer (SA-400, manufactured by NIPPON DENSHOKU) to obtain the yellowing (b*) and yellow index (YI). The results are listed in Table 4.

TABLE 4

| | polyamic acid (parts by weight) | silica (parts by weight) | TEOS (parts by weight) | transmittance at 550 nm (%) | yellowing (b*) | yellow index (YI) |
|---|---|---|---|---|---|---|
| Comparative Example 5 | 100 | 0 | 0 | 88.39 | 3.4 | 5.82 |
| Example 15 | 70 | 30 | 0 | 89.6 | 3.5 | 5.95 |
| Example 16 | 70 | 20 | 10 | 89.58 | 2.94 | 5.01 |
| Example 17 | 70 | 10 | 20 | 89.1 | 3.08 | 5.28 |
| Example 18 | 70 | 0 | 30 | 88.76 | 2.94 | 5.06 |
| Example 19 | 70 | 15 | 15 | 89.05 | 3.55 | 6.08 |
| Example 20 | 70 | 15 | 20 | 89.28 | 3.11 | 5.36 |
| Example 21 | 70 | 15 | 30 | 89.32 | 2.9 | 5.02 |
| Example 22 | 70 | 15 | 40 | 89.35 | 2.78 | 4.8 |

As can be realized from the result of Table 4, in Examples 19-22, when the ratio of the added TEOS is higher, not only the high transmittance can be maintained but also the yellowing and the yellow index can be reduced. [Examples 23-25 and Comparative Example 6]

The same process as in Example 1 was repeated to prepare the polyimide thin film, except that DP5 (diamine: ODA, TFMB; dianhydride: 6FDA, BPDA; molar ratio was 1:1.05, manufactured by WAKAYAMA) was used as polyamic acid and the precursor solutions of Examples 23-25 and Comparative Example 6 were respectively prepared according to the ratio cited in Table 5. The resulting polyimide thin films were respectively measured by a spectrophotometer (SA-400, manufactured by NIPPON DENSHOKU) to obtain the yellowing (b*) and yellow index (YI). The results are listed in Table 5.

TABLE 5

| | polyamic acid (parts by weight) | silica (parts by weight) | TEOS (parts by weight) | transmittance at 550 nm (%) | yellowing (b*) | yellow index (YI) |
|---|---|---|---|---|---|---|
| Comparative Example 6 | 100 | 0 | 0 | 88.81 | 4.68 | 9.45 |
| Example 23 | 70 | 25 | 5 | 89.25 | 3.45 | 6.27 |
| Example 24 | 70 | 20 | 10 | 89.38 | 2.88 | 5.16 |
| Example 25 | 70 | 5 | 25 | 90.02 | 2.43 | 4.82 |

As can be realized from the results in Table 5, in Examples 23-25, although the ratio of the inorganics is the same, the ratio of the added alkoxydecane (TEOS) is increased and the content of silica particles is reduced, which not only improves the transmittance but also reduces the yellowing and the yellow index of the polyimide thin film.

Figure 4A:
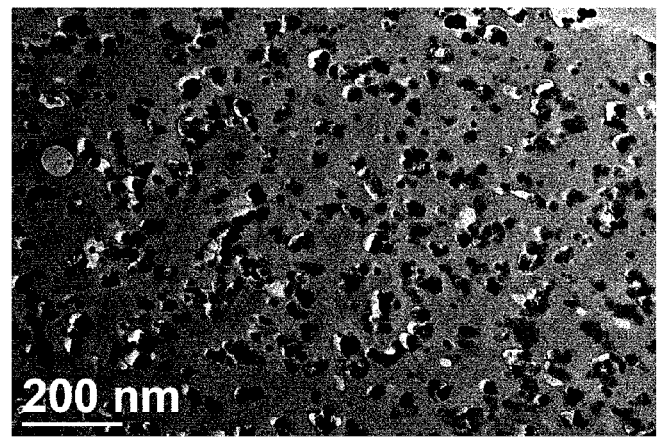
FIG. 4A is a transmission electron micrograph of the polyimide hybrid material of an example.
Figure 4B:
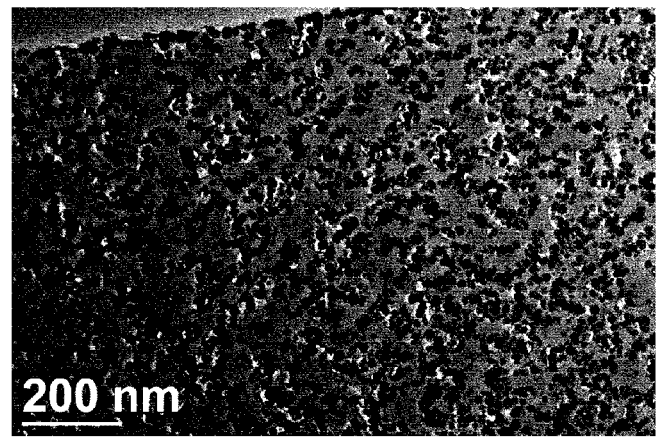
FIG. 4B is a transmission electron micrograph of the polyimide hybrid material of an example.
Figure 4C:
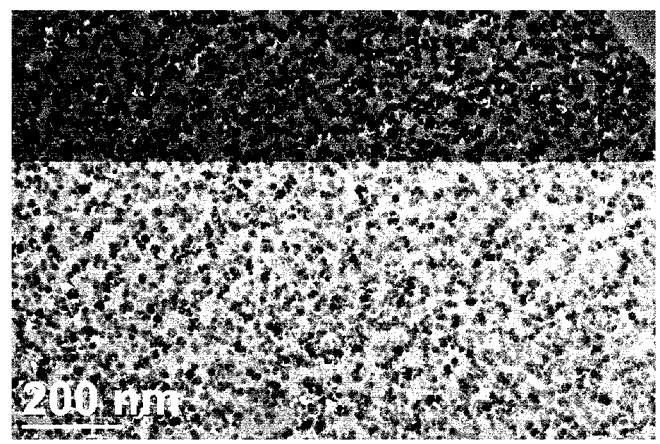
FIG. 4C is a transmission electron micrograph of the polyimide hybrid material of an example.

In addition, the polyimide thin films obtained in Examples 23, 24, and 25 were observed using a transmission electron microscope, the obtained images were shown in FIG. 4A, FIG. 4B, and FIG. 4C, respectively. As can be realized from the result of FIG. 4A (Example 23), when the content of silica particles is higher and the content of alkoxydecane (TEOS) is lower, the particle sizes of the inorganic particles in the polyimide thin film are bigger, and the inorganic particles are looser, and the distances between the particles are longer. As shown in FIG. 4B (Example 24) and FIG. 4C (Example 25), while the content of alkoxydecane (TEOS) is increased, the particle sizes of the inorganic particles in the polyimide thin film become smaller, and the pitches between particles are shortened. It can be seen that there is a connection between particles, and the connection is the dendritic siloxane skeleton.

The images above from a transmission electron microscope confirm that in the polyimide solution of the present disclosure, which includes a specific ratio of silica particles and alkoxysilane, without any catalyst, the alkoxysilane forms a siloxane skeleton on the silica particles merely promoted by the high temperature of thermal imidization, which in turn forms the self-assembled nano-scaled silica particles with the dendritic siloxane skeleton connecting the silica particles to one another.

The polyimide thin film formed by the polyimide precursor solution of the present disclosure has high transmittance, low yellowing, and low yellow index even after high-temperature processing, and is a flexible substrate suitable for use in various industries.

What is claimed is:

1. A polyimide precursor solution, consisting essentially of:
   100 parts by weight of a fully aromatic polyamic acid;
   5-20 parts by weight of silica particles;
   5-80 parts by weight of an alkoxysilane; and
   40-80 parts by weight of a solvent,
   wherein the alkoxysilane is configured to undergo a sol-gel reaction to form a dendritic siloxane skeleton between the silica particles.

2. The polyimide precursor solution as claimed in claim 1, wherein the fully aromatic polyamic acid is polymerized by an aromatic diamine and an aromatic dianhydride, and the molar ratio of the aromatic diamine and the aromatic dianhydride is 1:1.15-1:1.02.

3. The polyimide precursor solution as claimed in claim 2, wherein the aromatic diamine is at least one selected from the group consisting of the structures represented by formula (1), formula (2) and formula (3):

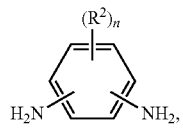

formula (1)

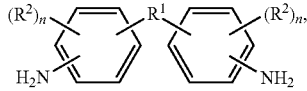

formula (2)

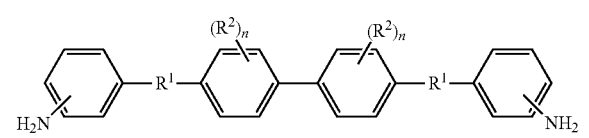

formula (3)

wherein $R^1$ is a single bond, —O—, —S—, —CH$_2$—, —S(O)$_2$—, —C(CF$_3$)$_2$—, —C(CH$_3$)$_2$—, —O—(CH$_2$)$_c$—O—, —(O—CH$_2$—CH$_2$)$_c$—O—, haloalkyl group, substituted or unsubstituted $C_{1-10}$ linear or branched hydrocarbylene group, substituted or unsubstituted $C_{6-20}$ arylene group,

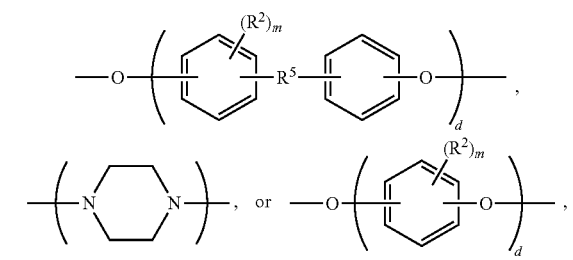

wherein each of c and d is independently an integer between 1 and 20; each of m is independently an integer between 0 and 4;
each of $R^2$ is independently hydrogen, halogen, alkyl group, $C_{1-4}$ alkoxy group, hydroxyl group, $C_{1-4}$ haloalkyl group, or substituted or unsubstituted $C_{1-6}$ hydrocarbon group; $R^5$ is a single bond, —S(O)$_2$—, substituted or unsubstituted $C_{1-4}$ linear or branched hydrocarbylene group, or $C_{1-4}$ halogenalkylene group; and
each of n is independently an integer between 0 and 4.

4. The polyimide precursor solution as claimed in claim 2, wherein the aromatic dianhydride is at least one selected from the group consisting of the structures represented by formula (4) and formula (5):

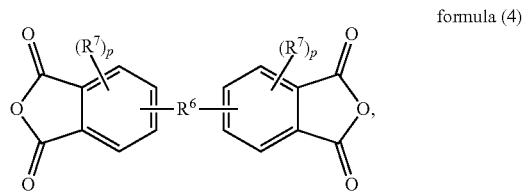

formula (4)

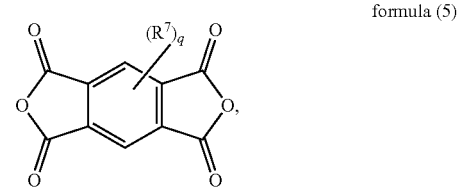

formula (5)

wherein $R^6$ is a single bond, —O—, —S—, —CH$_2$—, —S(O)$_2$—, —C(CF$_3$)$_2$—, —C(CH$_3$)$_2$—, —O—(CH$_2$)$_c$—O—, —(O—CH$_2$—CH$_2$)$_c$—O—, haloalkyl group, substituted or unsubstituted $C_{1-10}$ linear or branched hydrocarbylene group, substituted or unsubstituted $C_{6-20}$ aryl ene group,

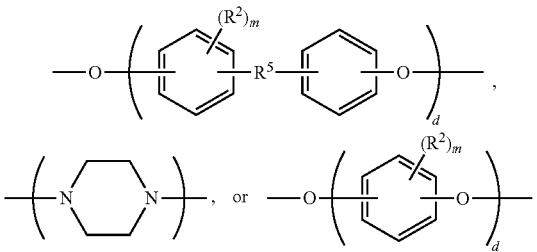

wherein each of c and d is independently an integer between 1 and 20; each of m is independently an integer between 0 and 4; each of $R^2$ is independently hydrogen, halogen, alkyl group, $C_{1-4}$ alkoxy group, hydroxyl group, $C_{1-4}$ haloalkyl group, or substituted or unsubstituted $C_{1-6}$ hydrocarbon group; $R^5$ is a single bond, —S(O)$_2$—, substituted or unsubstituted $C_{1-4}$ linear or branched hydrocarbylene group, or $C_{1-4}$ halogenalkylene group;
   each of $R^7$ is independently hydrogen, halogen, alkyl group, $C_{1-4}$ alkoxy group, hydroxyl group, $C_{1-4}$ haloalkyl group, or substituted or unsubstituted $C_{1-6}$ hydrocarbon group;
   each of p is independently an integer between 0 and 4; and q is an integer between 0 and 2.

5. The polyimide precursor solution as claimed in claim 2, wherein at least one of the aromatic diamine and the aromatic dianhydride has halogen substituents.

6. The polyimide precursor solution as claimed in claim 1, wherein the particle size of the silica particles is 0.5-20 nm.

7. The polyimide precursor solution as claimed in claim 1, wherein the alkoxysilane comprises tetramethoxysilane, tetraethoxysilane, tetrapropoxysilane, tetrabutoxysilane, or a combination thereof.

8. The polyimide precursor solution as claimed in claim 1, wherein the solvent is selected from N,N-dimethylformamide (DMF), N,N-diethylformamide, N,N-dimethylacetamide (DMAc), N,N-diethylacetamide, N-methylpyrrolidone (NMP), N-ethylpyrrolidone (NEP), dimethylsulfoxide (DMSO), diethyl sulfoxide, γ-butyrolactone (GBL), xylene, tetrahydrofuran, or a combination thereof.

9. The polyimide precursor solution as claimed in claim 1, wherein the polyimide precursor solution does not comprise a catalyst for a sol-gel reaction.

10. A polyimide hybrid material, which is formed by the polyimide precursor solution as claimed in claim 1, comprising:
   95-40 parts by weight of a fully aromatic polyimide; and
   5-60 parts by weight of an inorganic silicon mixture,
   wherein the inorganic silicon mixture is silica particles connected to each other by a siloxane skeleton and the siloxane skeleton forms a hydrogen bond with the polyimide,
   wherein the polyimide hybrid material has a transmittance that is greater than 80% at a wavelength of 550 nm and a yellowing b* less than 3.

11. The polyimide hybrid material as claimed in claim 10, wherein the siloxane skeleton has a dendritic structure.

12. The polyimide hybrid material as claimed in claim 11, wherein the dendritic branch width of the dendritic structure is 5-30 nm.

13. The polyimide hybrid material as claimed in claim 10, wherein the siloxane skeleton is formed by growing the alkoxysilane on the silica particles.

14. The polyimide hybrid material as claimed in claim 10, wherein the silica particles is 20-85 wt % and the siloxane skeleton is 80-15 wt % of the inorganic silicon mixture, based on the total weight of the inorganic silicon mixture.

15. A manufacturing method of the polyimide hybrid material of claim 10, comprising:
   (a) condensation polymerizing at least one aromatic dianhydride monomer and at least one aromatic diamine monomer in a solvent to form a fully aromatic polyamic acid;
   (b) providing a silica mixture containing a silica sol and an alkoxysilane;
   (c) mixing the silica mixture with the fully aromatic polyamic acid to form a polyimide precursor solution; and
   (d) performing an imidization to the polyimide precursor solution to form a polyimide hybrid material.

16. The manufacturing method of polyimide hybrid material as claimed in claim 14, wherein the imidization is performed at 300° C.-500° C.

17. The manufacturing method of polyimide hybrid material as claimed in claim 14, wherein the silica sol and the alkoxysilane are self-assembled to form the siloxane skeleton during the imidization.

18. The manufacturing method of polyimide hybrid material as claimed in claim 14, further comprising coating the polyimide precursor solution to a substrate before the imidization.

* * * * *